METHOD OF MANUFACTURING USEFUL GAPS OF ACCURATELY THE SAME LENGTH THROUGHOUT THEIR WIDTH BETWEEN TWO CIRCUIT PARTS OF A MAGNETIC HEAD

Filed Dec. 20, 1965

INVENTOR.
JACOB KOORNEEF
JACOBUS P. BEUN
BY
Frank R. Trifari
AGENT

United States Patent Office 3,395,450

Patented Aug. 6, 1968

3,395,450
METHOD OF MANUFACTURING USEFUL GAPS OF ACCURATELY THE SAME LENGTH THROUGHOUT THEIR WIDTH BETWEEN TWO CIRCUIT PARTS OF A MAGNETIC HEAD

Jacob Koorneef and Jacobus Pieter Beun, Emmasingel, Eindhoven, Netherlands, assignors to North American Philips Company, Inc., New York, N.Y., a corporation of Delaware Filed Dec. 20, 1965, Ser. No. 515,045
Claims priority, application Netherlands, Dec. 31, 1964, 6415293
6 Claims. (Cl. 29—603)

ABSTRACT OF THE DISCLOSURE

A method of manufacturing a magnetic head with a uniform length gap by the steps of providing first and second blocks of magnetic material to be joined by means of a non-magnetic bonding material, providing first and second pairs of wires adjacent to the upper and lower surfaces of the magnetic block assembly remote from the joined surfaces, placing first and second dies onto the surface of the respective first and second pairs of wires, and applying pressure to the dies which in turn, through the pairs of wires, applies a substantially uniform pressure along the length of the gap formed between the blocks of magnetic material.

Figure 1:
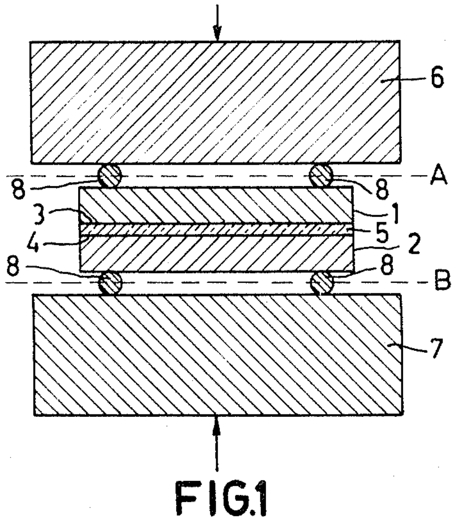

The invention relates to a method of accurately manufacturing useful gaps of the same length throughout their width between two circuit parts of a magnetic head useful for recording, reproducing and/or erasing magnetic recordings. The space between the circuit parts is filled with non-magnetizable material which at the same time adheres the two circuit parts to each other, the two circuit parts each being provided with a surface, machined to accurate smoothness and being joined to each other by these surfaces. The filling material is disposed on or in the gap thus obtained. The filling material is then heated to its melting temperature and the plates are pressed against each other with the aid of dies.

Such a method is known and is commonly used in the manufacture of magnetic heads having a very narrow useful gap (of the order of $1\mu$). With the interposition of the filling material of the gap which at the same time adheres the parts to each other, the surfaces of the circuit parts, polished to accurate smoothness, are pressed against each other with the aid of dies.

It is found to be very difficult, if not impossible, to maintain a constant pressure throughout the surfaces joining each other, in order to obtain a gap which has at all places accurately the same length (tolerance $0.2\mu$). It has been found that with a length of the surfaces of, for example 40 mms., only a part of approximately 10 mms. length, situated at the centre of the surfaces, satisfies the imposed requirements. This involves a considerable loss of material.

The invention avoids the said difficulties and the method according to the invention is characterized in that wires of approximately circular cross-section are disposed between a circuit part and a die co-operating therewith. The wires have a melting temperature exceeding that of the filling material and can be compressed at the melting temperature of the filling material, the projection of the point of application of the pressure force, exerted on the die onto a plane passing through the center lines of the wires being located between the wires.

According to this method, it has been found that throughout the surfaces limiting the gap to be formed, the pressure is the same and consequently the distance between these surfaces, the length of the gap, will be the same everywhere on these surfaces. Loss of material is then avoided.

The material of which the wires are made must be chosen in accordance with the filling material of the gap. At the heating temperature at which the filling material becomes liquid and, for example, is sucked into the gap, owing to the capillary action of the gap, the wires must just be sufficiently compressible to serve as a cushion for the die so that the pressure is distributed uniformly throughout the surface.

When the supporting faces of the wires are excessively flattened, for example, when their cross-sections have the form of an ellipse of great eccentricity, the cushion effect is found to be too small. Wires having a diameter in the order of 0.2 mm. prove to be satisfactory in practice.

If the projection of the point of application of the pressure force exerted on the die, onto the plane passing through the center lines of the wires, is located beyond the wires, this results in a non-uniform distribution of the pressure on the surfaces between which the gap is formed and the length of the gap, as far as its constancy is concerned, will not fulfill the imposed requirements.

Generally, at least one circuit part will have a channel-shaped profile on the side of the accurately machined surface. The channel constitutes the recess in which the required coils are accommodated for the finished head. This channel extends in the direction of the width of the gap and according to an embodiment of the method in accordance with the invention, it is then advantageous when the wires are disposed substantially parallel to the channel and entirely above or below the parts of the circuit parts, which are supported in the direction of pressure.

As a result of the fact that one or both surfaces are profiled, they are in contact with each other only over certain parts. It is then necessary for the wires to be disposed on the circuit parts at those places at which the circuit parts are supported on the other side. This support may also be obtained, for example, by means of a spacer disposed between the surfaces.

In modern technology, the filling material of the gap generally consists of glass or enamel. The melting temperatures of these materials lie in the proximity of 800° C. and according to an embodiment of the invention, copper wires are particularly suitable for use in the described new method.

In the said method, it is usual that the dies take the form of flat discs between which the circuit parts to be pressed against each other, are clamped. According to a further embodiment of the invention, it is advantageous to use dies taking the form of pyramids, and that the pressure force is applied to the apex. When such dies are used, the distribution of the pressure force on the surfaces to be pressed against each other is as uniform as possible.

The invention also relates to gaps between circuit parts of a magnetic head obtained by one or more of the methods described hereinbefore.

Figure 2:
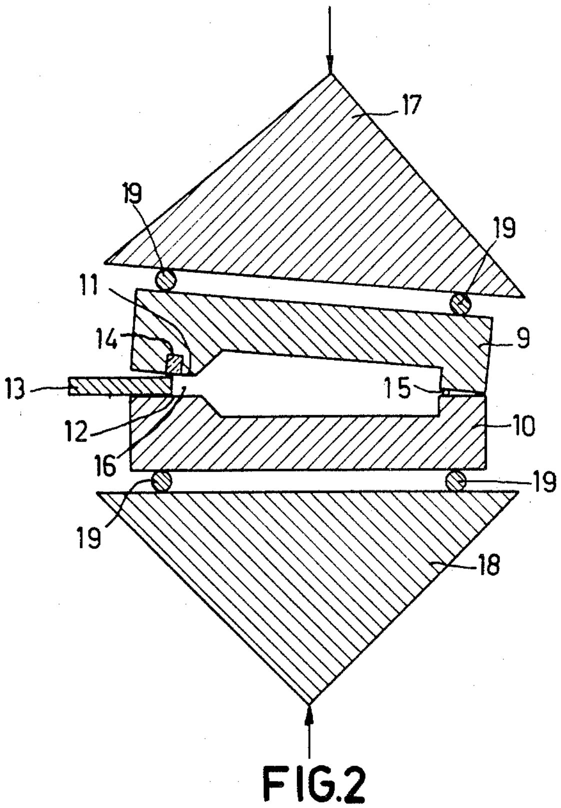

The invention will now be described more fully with reference to the drawing, in which FIG. 1 is a vertical section of dies, wires and circuit parts, which latter parts are pressed against each other, and FIG. 2 is also a vertical section in which the dies have the form of pyramids and the section passes through their apex.

Referring now to FIG. 1, reference numerals 1 and 2 denote circuit parts which are each provided with a smoothly machined surface 3 and 4, respectively. Between these surfaces, provision is made of material 5, for example, glass or enamel, which in the finished state completely fills the gap and at the same time adheres the two circuit parts to each other.

Both circuit parts 1 and 2 are pressed against each other with the aid of dies 6 and 7. Between dies and circuit parts, provision is made of wires 8 having a diameter of, for example, 0.2 mm.

The circuit parts are pressed against each other and simultaneously heated to a temperature at which the filling material of the gap melts (for glass approximately 800° C.). At this temperature, the wires 8 become so soft that they can readily be compressed in the direction of pressure indicated with arrows.

The condition must be fulfilled that the projection of the point of application of the pressure force exerted on the dies, falls onto the planes A and B is located between the wires 8.

FIG. 2 shows two circuit parts 9 and 10 which are each provided with accurately machined surfaces 11 and 12. The length of the gap can be adjusted by means of a spacer 13. In this embodiment, the filling material of the gap is disposed in a recess 14 from which it is sucked by capillary action into the gap 16 after being heated to the melting temperature.

In this embodiment, both circuit parts 9 and 10 have a channel-shaped profile. On the lower side of the channel, the circuit parts are adhered to each other preferably with the aid of the same material 15 which serves as filling material of the gap. In this case the compression is also effected by means of dies 17 and 18 and copper wires 19, disposed between the dies and the circuit parts. In order to maintain the pressure on the limiting faces 11 and 12 of the gap as constant as possible, it is advantageous to dispose the wires 19 parallel to the channel, as shown in the drawing. In order to obtain a uniform distribution of the pressure on the faces 11 and 12, it is necessary for the copper wires 19 to be located above or below a place at which the circuit parts 9 and 10 engage each other. In FIG. 2, the circuit parts are not in direct contact with each other, but engage each other by means of the spacer 13 and the wires must be located above the place at which the circuit part 9 bears on this spacer.

Since in this embodiment, the circuit parts are at an angle to each other, as a result of which the faces of the dies between which the parts are clamped, will not be parallel to each other either, it is in this case practically impossible to obtain an equal pressure in large areas of the faces limiting the gap, without using the method of the invention. Particularly in cases of this kind, the said method provides a considerable improvement.

In this event, the dies 17 and 18 have the form of a pyramid, which results in that the distribution of the pressure force exerted on the circuit parts, which force is applied to the apex of the pyramid, is particularly uniform.

What is claimed is:

1. A method of forming a uniform-length gap for a magnetic transducer, head comprising: disposing a fusible nonmagnetic gip-filling bonding material adjacent to smoothly machined spaced surfaces of two circuit parts composed of magnetic material, each circuit part having at least one surface opposite to and remote from said machined surfaces, placing at least one pair of wires in contact with each of said remote surfaces, placing a die in contact with each pair of wires at the portion thereof remote from said remote surfaces, said wires having a fusion temperature greater than the fusion temperature of the gap-filling material, heating said gap-filling material to the temperature at which it fuses, and applying pressure to said dies during fusion of the gap-filling material, the projection of application of said pressure being along a line passing through a plane joining each pair of wires, said wires serving to distribute pressure substantially uniformly.

2. A method as claimed in claim 1, wherein said gap-filling material is constituted of glass or enamel, and said wires are constiuted of copper.

3. A method as claimed in claim 1, wherein said dies have the form of pyramids each having an apex remote from said circuit parts, said pressure being applied to said apices.

4. A method of forming a uniform-length gap for a magnetic transducer head, comprising: disposing a fusible non-magnetic gap-filling bonding material adjacent to smoothly machined spaced surfaces of two circuit parts composed of magnetic material, each circuit part having at least one surface opposite to and remote from said machined surfaces, at least one of said smoothly machined surfaces having a channel-shaped configuration, placing at least one pair of wires in contact with each of said remote surfaces and substantially parallel to the channel, placing a die in contact with each pair of wires at the portion thereof remote from said remote surfaces, said wires having a fusion temperature greater than the fusion temperature of the gap-filling material, heating said gap-filling material to the temperature at which it fuses, and applying pressure to said dies during the fusion of the gap-filling material, the projection of application of said pressure being along a line passing through a plane joining each pair of wires, said wires being sufficiently compressible at said fusion temperature to serve as a cushion for said die to distribute said pressure substantially uniformly along said smoothly machine spaced surface.

5. A method as claimed in claim 4, wherein said dies have the form of pyramids each having an apex remote from said circuit parts, said pressure being applied to said apices.

6. A method as claimed in claim 4, wherein said gap-filling material is constituted of glass or enamel, and said wires are constituted of copper.

References Cited

UNITED STATES PATENTS

| | | | |
|---|---|---|---|
| 3,094,772 | 6/1963 | Duinker. | |
| 3,117,367 | 1/1964 | Duinker et al. | 29—603 |
| 3,246,383 | 4/1966 | Peloschek et al. | 29—603 |
| 3,333,332 | 8/1967 | Vrolijks et al. | 29—603 |
| 3,340,518 | 9/1967 | Hanson. | |

FOREIGN PATENTS

| | | |
|---|---|---|
| 1,167,892 | 4/1964 | Germany. |

JOHN F. CAMPBELL, *Primary Examiner.*

D. C. REILEY, *Assistant Examiner.*